United States Patent [19]

Fawcett et al.

[11] 3,927,329

[45] Dec. 16, 1975

[54] METHOD AND APPARATUS FOR CONVERTING ONE FORM OF ENERGY INTO ANOTHER FORM OF ENERGY

[75] Inventors: Sherwood L. Fawcett, Columbus; James N. Anno, Cincinnati, both of Ohio

[73] Assignee: Battelle Development Corporation, Columbus, Ohio

[22] Filed: Apr. 11, 1974

[21] Appl. No.: 460,187

Related U.S. Application Data

[60] Division of Ser. No. 323,770, Jan. 15, 1973, Pat. No. 3,859,789, which is a continuation-in-part of Ser. No. 222,220, Jan. 31, 1972, abandoned.

[52] U.S. Cl. .................... 290/1; 60/325; 418/33; 60/370
[51] Int. Cl.² .................... H02P 9/04; F15B 21/00
[58] Field of Search ............ 418/33; 290/1, 52, 43, 290/54; 60/721, 326, 325–327; 310/11, 4

[56] References Cited
UNITED STATES PATENTS

| | | | |
|---|---|---|---|
| 1,307,210 | 6/1919 | Newcomb | 290/52 |
| 1,729,242 | 9/1929 | Bregere | 418/33 |
| 3,187,191 | 6/1965 | Baggs | 290/52 |
| 3,375,664 | 4/1968 | Wells | 310/11 |
| 3,496,871 | 2/1970 | Stengel | 60/325 |
| 3,616,645 | 11/1971 | VanDerVoort | 60/326 |
| 3,689,931 | 9/1972 | Fortis | 290/52 |

Primary Examiner—Robert K. Schaefer
Assistant Examiner—John W. Redman
Attorney, Agent, or Firm—Brown, Murray, Flick & Peckham

[57] ABSTRACT

Method and apparatus for converting one form of energy into another form of energy with the use of a closed, continuous loop passageway containing a plurality of freely movable, mechanically unrestrained bodies which travel around the passageway in one direction only. Force is applied to successive ones of the bodies in one region of the passageway to thereby propel the bodies around the passageway. At a point removed from the aforesaid region, at least a portion of the kinetic energy of the propelled bodies is converted into electrical energy or a compressed fluid. Thereafter, successive ones of the bodies are returned back to the starting region where they are again propelled in one direction by application of a force thereto. The bodies, usually in the form of spheres, are propelled by expansion of a gaseous medium due to combustion of a gaseous fuel mixture or by a traveling magnetic field. The kinetic energy of the bodies is extracted either by causing the propelled bodies, formed from magnetically permeable material, to pass through an electromagnetic field to convert some of the kinetic energy to electrical energy, or by compressing fluid between the bodies to provide energy in the form of a compressed fluid.

10 Claims, 10 Drawing Figures

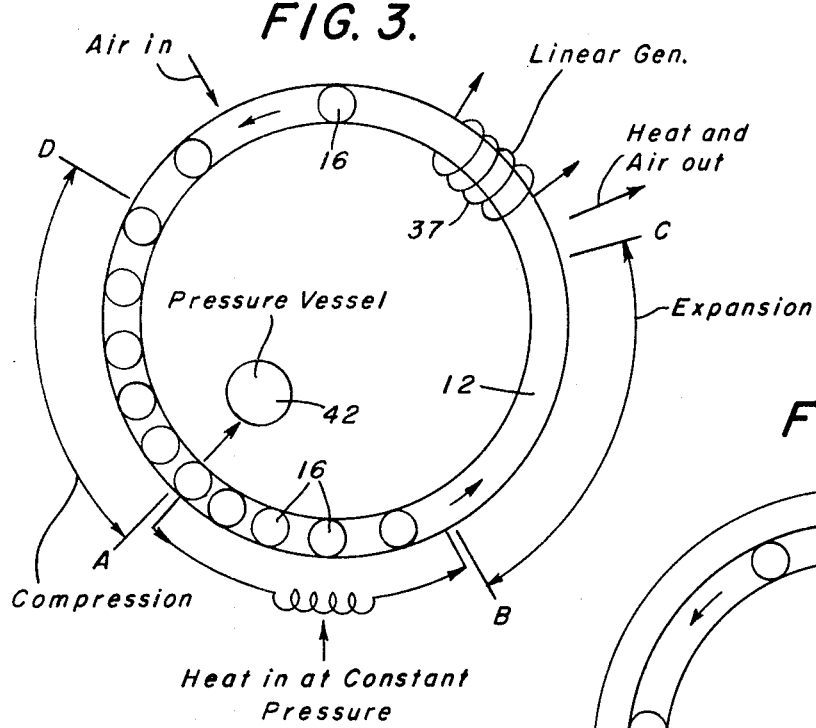
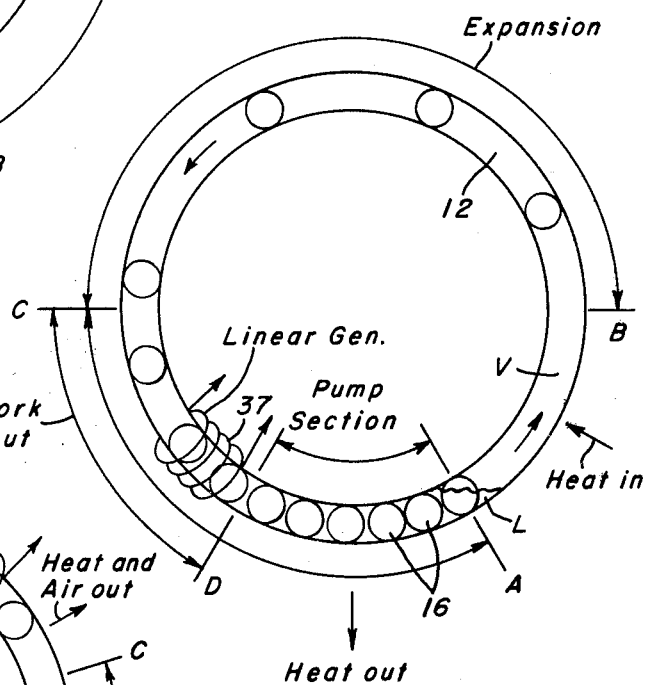
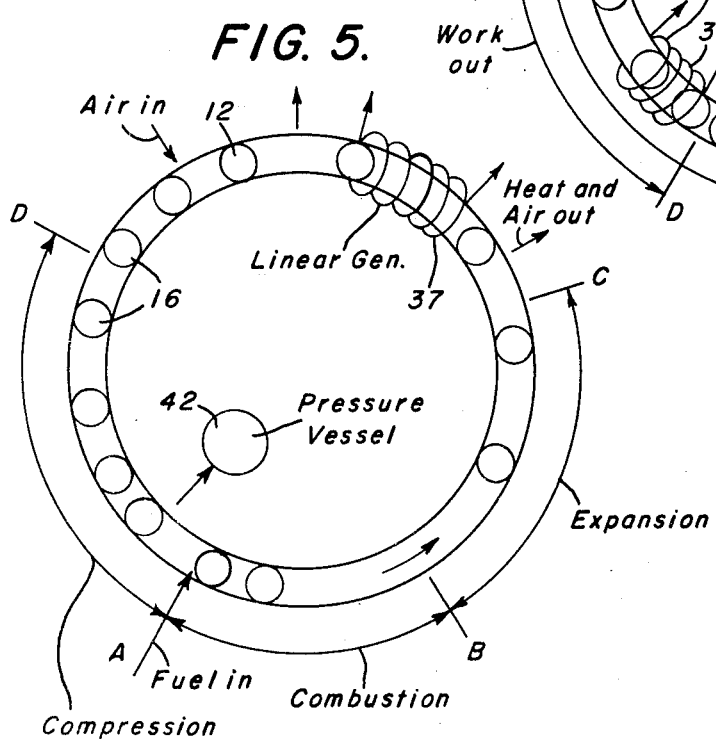

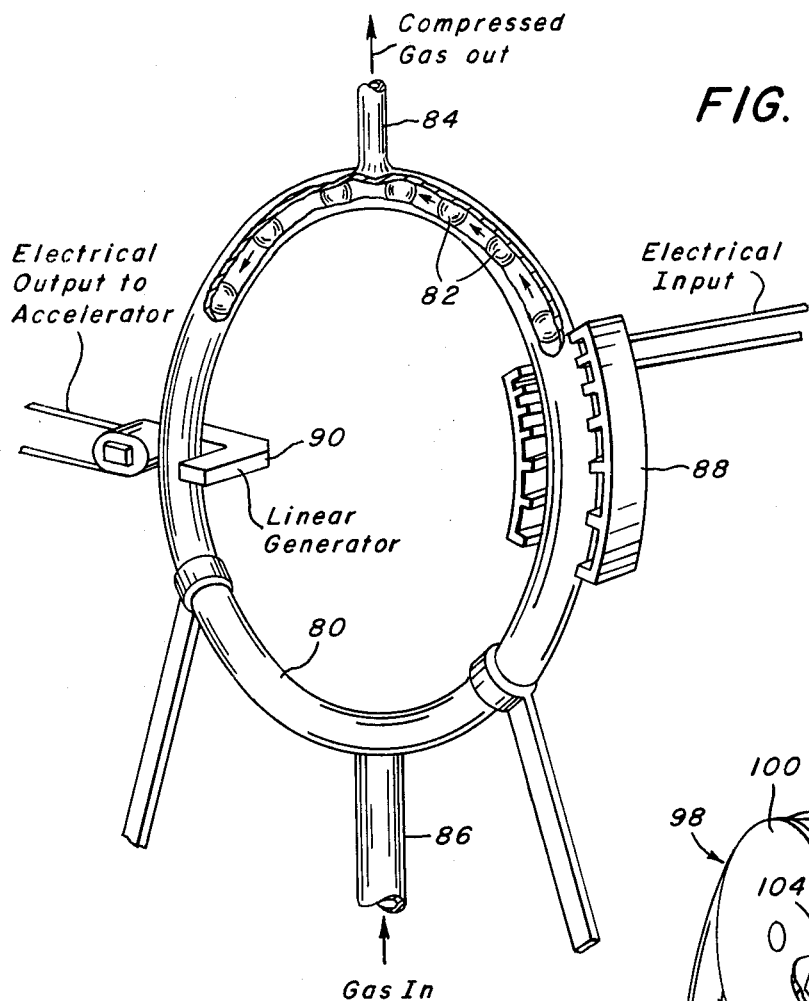
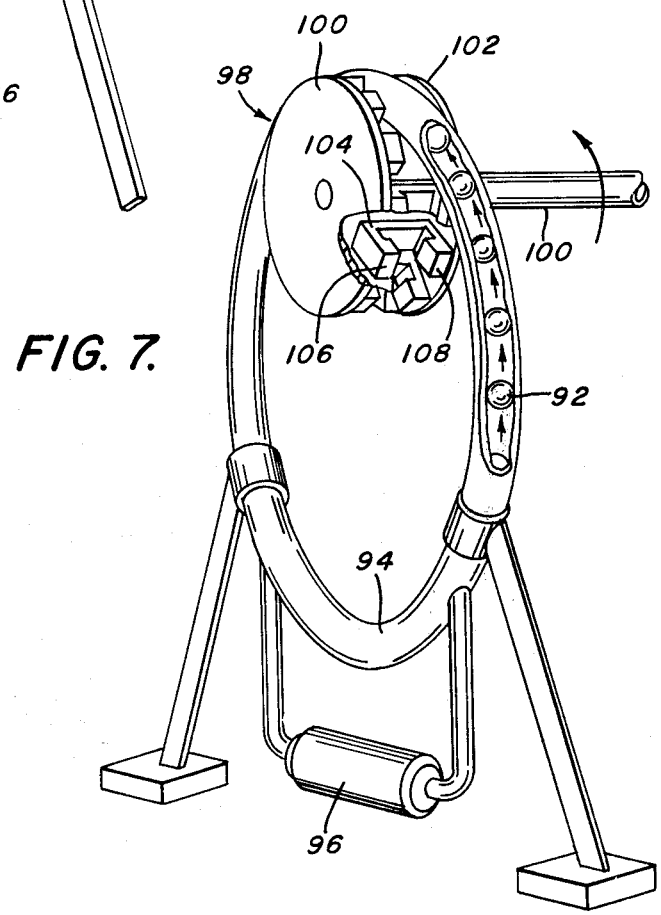

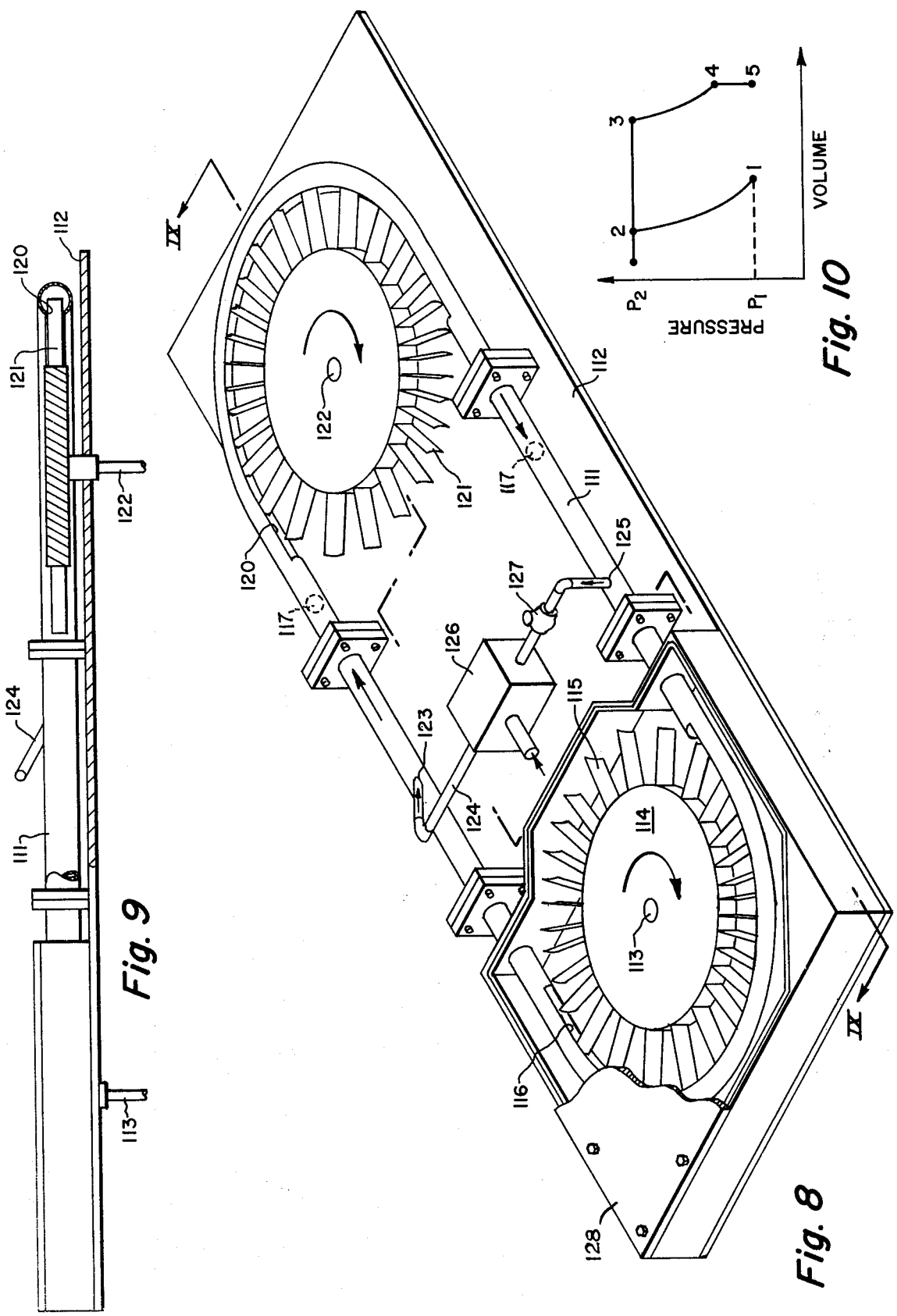

METHOD AND APPARATUS FOR CONVERTING ONE FORM OF ENERGY INTO ANOTHER FORM OF ENERGY

This application is a division of our copending patent application, Ser. No. 323,770, filed Jan. 15, 1973, (now U.S. Pat. No. 3,859,789, issued Jan. 14, 1975) which application is a continuation-in-part of application Ser. No. 222,220, filed Jan. 31, 1972 and now abandoned.

BACKGROUND OF THE INVENTION

In the past, many systems using various thermodynamic cycles, such as the Otto, Rankine and Brayton cycles, have been used to convert one type of energy into another type. Most of these systems employ reciprocating pistons; although some, such as those shown in Dutch Pat. No. 65,164 and German Pat. No. 842,645 employ one or more pistons which are forced to travel in one direction in a continuous closed loop by the expansion of a gaseous medium in one region of the closed loop. In the closed loop systems of the prior art, however, each piston is coupled to a mechanical element which moves with it, the kinetic energy of the moving piston being converted directly into mechanical energy. Closed loop systems of this prior art type, while possibly workable, require complicated mechanisms for coupling the piston or pistons to an associated mechanical element; and it is possibly for this reason that they have not found any extensive amount of commercial acceptance.

SUMMARY OF THE INVENTION

In accordance with the present invention, a system is provided for converting one type of energy into another type by means of a closed loop passageway containing a plurality of freely movable, mechanically unrestrained bodies, meaning that the bodies are not coupled to a mechanical element but can be propelled around the loop in much the same manner as a projectile. Successive ones of the bodies, preferably spheres having diameters slightly less than that of a tubular passageway through which they travel, are propelled in one direction around the passageway by application of a suitable force applied in one region of the passageway. Acceleration of the bodies is effected by means of combustion of a gaseous fuel mixture or by an electromagnetic linear accelerator.

After the bodies are thus accelerated, they pass through a second region where the momentum of the traveling bodies is converted into another form of energy. This is accomplished by forming the bodies from a magnetically permeable material and by passing them through the magnetic field of a linear generator which converts the energy of the moving bodies into electrical energy. Alternatively, the momentum of the moving bodies can be used to compress a gas.

The above and other objects and features of the invention will become apparent from the following detailed description taken in connection with the accompanying drawings which form a part of this specification, and in which:

FIG. 3 is a schematic illustration of the utilization of the present invention in conjunction with the principles of a Brayton cycle;

FIG. 4 is a schematic illustration of the utilization of the present invention in conjunction with the principles of a Rankine cycle;

FIG. 5 is a schematic illustration of the utilization of the present invention in conjunction with the principles of an Otto cycle;

FIG. 6 is a schematic representation of the invention employing a linear accelerator for the purpose of propelling bodies around a closed loop passageway;

FIG. 7 is a schematic representation of still another embodiment of the invention wherein the propelled bodies, formed from magnetically permeable material, are utilized in conjunction with a magnet and disc assembly for converting their kinetic energy into a crankshaft action;

FIG. 8 is a perspective view, partly broken away, of a further embodiment of the invention;

FIG. 9 is a longitudinal section taken on the line IX—IX of FIG. 8; and

FIG. 10 is a diagram showing the cycle of the FIG. 8 apparatus.

Figure 1:
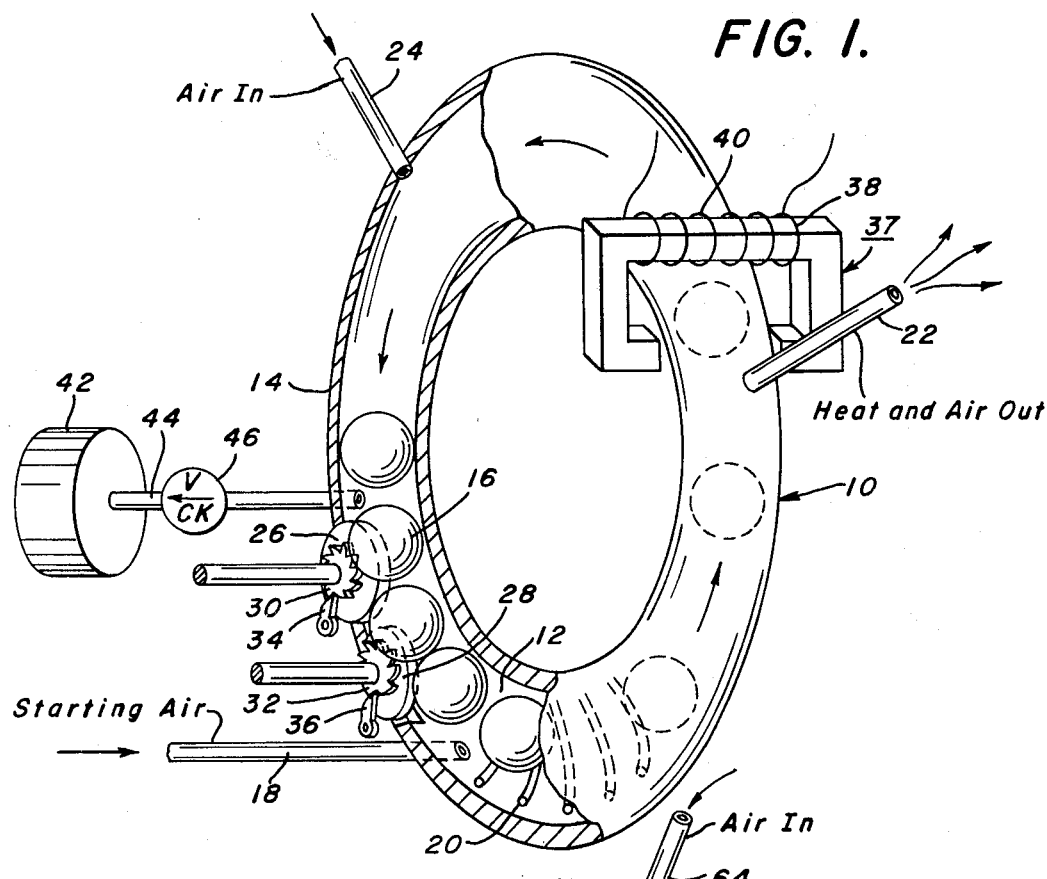
FIG. 1 is a perspective view, partially in cross section, of an engine that embodies the principles of the invention.

With reference now to the drawings, and particularly to FIG. 1, there is shown an engine 10 comprising a torus or closed loop passageway 12. The passageway 12 is defined by a housing 14 having walls which are preferably smooth and formed from metal. Disposed within the passageway 12 is a plurality of solid pistons 16 shown as spheroids. The tolerances or clearances between the surfaces of spheroids 16 and the inside walls of the passageway 12 are such as to permit the spheroids to move freely along the track 12. However, fluid flow past the spheroids within the passageway is substantially prevented. In the embodiment of FIG. 1, for example, the loop passageway 12 has a circular cross section, but with other shaped pistons, other cross sections may be utilized including elliptical or polygonal cross sections with suitably shaped pistons.

In the embodiment shown in FIG. 1, a propelling force behind the spheroids may be provided at any given station or region along the passageway 12. A suitable propelling force in the form of gas pressure to urge the spheroids around the passageway 12 is shown as comprising an inlet tube 18 which is connected to a supply of compressed air from a compressor or other compressed air source, not shown. Compressed air inlet tube 18 may be used to start the engine 10 in some instances; however any other suitable source of fluid pressure behind spheroids 16 may be provided to operate the apparatus. In the embodiment of FIG. 1, heating coil 20 is embedded within or surrounds the housing 14 adjacent to the compressed air inlet tube 18. As will be understood, the coil 20 heats the air passing into the passageway 12 through inlet 18. Thus, after the apparatus has been started with compressed air through inlet 18, the heat supplied by coil 20 will cause the air within the passageway 12 to expand and provide the motivating force behind the spheroids 16. The quantity of compressed air introduced by inlet 18 can then be reduced or eliminated and the driving force derived from expansion of the gas between the spheroids due to the addition of heat thereto from coil 20.

The compressed air or expanding gas behind each of the spheroids 16 as they pass the vicinity of inlet 18 and coil 20 serves to propel the spheroids around the passageway 12 in a counterclockwise direction as shown by the arrow within the passageway 12. Thus, the heat energy introduced by the coil 20 or energy in the form of compressed air or gas is converted to the kinetic energy of the moving spheroids 16.

To facilitate movement of the spheroids 16 within the passageway 12, an air outlet 22 is provided in advance of the moving spheroids. This permits the spheroids to accelerate, under the force of the expanding gas, in the region between the coil 20 and outlet 22. In the embodiment of the invention shown, the outlet 22 is located about one-third of the distance along the loop passageway 12. An air inlet 24 is located at about another one-third of the distance around the passageway. As each spheroid 16 passes outlet 22, any expanding gas or other propelling fluid behind each individual piston is released through the outlet 22, and the energy introduced into the system in the vicinity of the inlet 18 and coil 20 will have been converted into kinetic energy. As each spheroid passes inlet 24, it commences to compress the air between it and the spheroid ahead of it as its momentum drives it to the energy input areas at inlet 18 and heating coil 20. As will be seen, however, it is possible in certain cases to eliminate vents 22 and 24 by cooling the fluid in this region.

Since the expanding gas in the energy input station of the passageway 12 can propel the spheroids 16 in a clockwise direction as well as in a counterclockwise direction, means are provided to prevent the spheroids from being so propelled just prior to their entry into the heat or pressure input station in the region of inlet 18 and coil 20. In the embodiment of the device shown in FIG. 1, this means comprises two wheels 26 and 28 that are rotatably mounted adjacent to passageway 12 and extend through slots provided in housing 14 such that their peripheries extend into the passageway 12 and contact each spheroid as it passes along the passageway. If the clearance between the slots and the wheels 26 and 28 is such that pressure cannot be maintained in this region, the wheels can be positioned within housings hermetically sealed to housing 14. Each of the wheels 26 and 28 is attached to, and rotates with, ratchets 30 and 32, respectively. Each ratchet 30 and 32 is provided with a conventional spring-loaded pawl 34, 36. Thus, in the operation of the device, wheels 26 and 28 may rotate in a clockwise direction but will not rotate in a counterclockwise direction. The peripheries of wheels 26 and 28 are composed of an elastomeric material such as rubber so that the spheroids 16, after passing inlet 24, cannot be propelled in a clockwise direction due to the action of fluid entering through inlet 18 or expanding gas or air effected by heat generated by the coil 20. Each spheroid 16, as it comes into the vicinity of wheels 26 and 28, expends the last of its kinetic energy to force the preceding spheroid 16 to move in the vicinity of and past the wheels 26 and 28 to be propelled again around the passageway 12 by expanding gas provided in the heat input vicinity of the passageway.

The embodiment of the invention shown in FIG. 1 illustrates two means by which the energy originating as heat or pressurized gas and converted into kinetic energy may be removed from the system. One mode is to provide a housing 14 that is constructed of non-magnetic material (e.g., aluminum). Spheroids 16 are then made of a magnetically permeable material (e.g., iron or steel) capable of cutting and altering a magnetic field. Between the outlet 22 and the inlet 24 is a linear generator, generally indicated by the reference numeral 37. In the embodiment of the invention shown, it comprises a yoke 38 forming a permanent magnet and having a winding 40 wound around a portion thereof. With this arrangement, the spheroids 16, formed of magnetically permeable material, will cut the lines of flux passing across the gap of the magnet and which intersect the path of travel of the spheroids 16. The arrangement is such that each time a spheroid passes through the magnetic field, a pulse will be induced in winding 40, this pulse representing electrical energy which can be conducted to a load, not shown. Alternatively, the permanent magnet 38 can be replaced by a yoke of magnetically permeable material having two windings thereon, one of which is utilized to generate a magnetic field across the path of the spheroids 16 and the other of which is used to derive energy in the form of pulses.

Another means for removing energy from the system consists of providing a pressure vessel 42 along with an outlet 44 leading from the passageway 12 and provided with an appropriate check valve 46 to bleed pressure from the device which builds up between the spheroids 16 as their kinetic energy compresses air introduced into the passageway through inlet 24. This fluid pressure stored in vessel 42 can, of course, be reintroduced through inlet 18. Thus, the device may be employed to generate electricity or can be used as a compressor, or both. In operation, pressure to inlet 18 will be controlled to effect sequential movement or firing of each of the spheroids 16 around the passageway 12 until a cyclic operation is induced. Heat is then gradually introduced via coil 20; and when the heat generation is sufficient, the supply of fluid via inlet 18 can be terminated.

Figure 2:
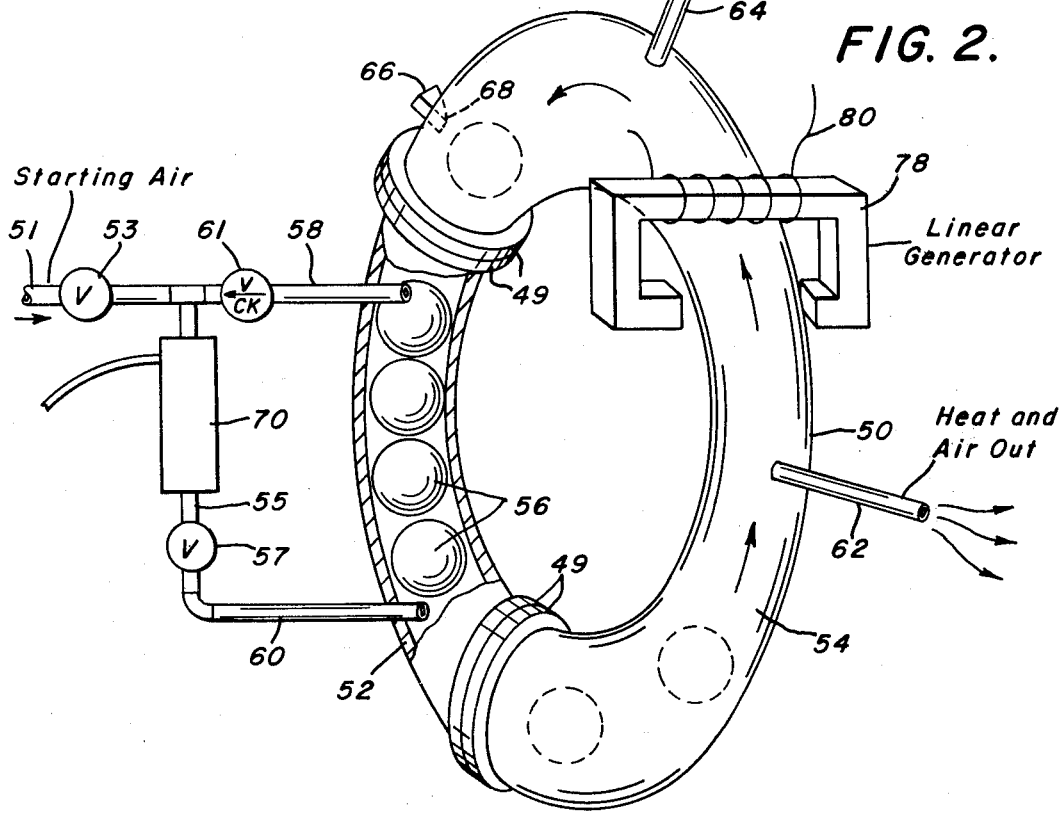
FIG. 2 is a perspective view, partially in cross section, of an engine that constitutes a modification of the apparatus of FIG. 1.

In the embodiment of FIG. 2, an engine 50 is shown constructed of a housing 54 fabricated from non-magnetic material such that the linear generator comprised of coil 80 and magnet 78 may appropriately function to remove energy from the system in the same manner as described in conjunction with the apparatus of FIG. 1. The housing 54 is formed in two parts, joined by flanges 49 and suitable fastening bolts, not shown. This facilitates fabrication of the closed passageway and insertion of the spheroids. The device of FIG. 2 operates in substantially the same manner as the device of FIG. 1 and is provided with a pressure input conduit 60 which corresponds to inlet 18 of the device of FIG. 1. Additionally, the device of FIG. 2 includes an air outlet 62 and an air inlet 64 corresponding to outlet 22 and inlet 24 of the apparatus of FIG. 1. The spheroids 56 are again propelled in a counterclockwise direction.

The device of FIG. 2, however, differs from that of FIG. 1 in several aspects. In place of the friction wheels 26 and 28, a small latch 66 is provided which is constructed in a substantially similar manner to a door latch in that it has a spring-loaded latching member 68 (spring loading not shown) that projects just into the passageway 52 of the housing 54 so as to contact each spheroid 56 passing the member 68. As each spheroid passes the latch 66, it will depress it to allow the spheroid to continue in a counterclockwise direction due to the fact that it is beveled in the direction of approach of such spheroids but will not depress to allow the spheroids to retreat in a clockwise direction.

In the pressure and heat input portion of the passageway 52, compressed gas or air from a compressor or other convenient source, not shown, is provided to inlet 60 through conduit 51, valve 53, heat exchanger 70, conduit 55 and valve 57. An outlet conduit 58 corresponding to inlet 24 in FIG. 1 is connected to heat exchanger 70 through a check valve 61. Input pressure may be regulated to effect smooth and efficient operation of the device, causing the spheroids to be propelled around the closed loop passageway in a counterclockwise direction. The heat exchanger or heater 70 is provided to cause the gas from conduit 51 or conduit 58 to further expand, increasing in velocity. In the operation of the device, the starting air will initially be introduced through conduit 51 and valve 53 until steady-state operations are established, at which point the valve 53 will be closed and the air to be expanded in heat exchanger 70 supplied through check valve 61.

The apparatus described in connection with FIGS. 1 and 2 may be used to effect a Brayton thermodynamic cycle as is illustrated in FIG. 3 wherein elements corresponding to those of FIG. 1 are identified by like reference numerals. Heat is introduced into an energy input portion of the loop as is illustrated by segment A–B. Expansion of a single-phase fluid within the system accelerates the spheroids within segment B–C. Heat and/or expanded fluid are removed from the system within segment C–D. When fluid is removed within the segment C–D, additional fluid is added within this segment. Maximum acceleration of the spheroids 16 occurs in the segment C–D and optionally or preferably some of this kinetic energy is removed or drained from the system by the utilization of a linear generator in segment C–D.

As the spheroids enter the segment D–A, the remaining kinetic energy is spent, compressing the single-phase fluid between each spheroid and its preceding spheroid prior to entry into the segment A–B. As will be understood, the expanding fluids effecting the motivating force within the segment B–C must be vented, preferably within the segment C–D, to prevent counterpressure from building up between each spheroid and its preceding spheroid which would rob them of their kinetic energy. However, it should be understood that the relief of such pressure may be provided by removing the heat (i.e., cooling) from the fluid within the segment C–D rather than venting the fluid from the system. Upon cooling, the fluid will contract with the same overall effect, making it unnecessary to add additional fluid in the segment C–D.

As is shown in conjunction with the embodiment of FIG. 1, an alternate method of removing energy from the system is to bleed a portion of the pressure from the segment D–A. Thus, it will be appreciated that the system can be utilized as a compressor as well as a generator. Another means for extracting energy in the segment C–D is to utilize a mechanical paddlewheel type device which extends through a slot in the closed loop passageway caused to rotate on sequential contact of its paddles with spheroids 16.

In FIG. 4, the applicability of the present invention to the thermodynamic principles of a Rankine cycle is shown. Under ordinary circumstances, this is a closed cycle. The working fluid is present in two phases, one being liquid L and one being a gas or vapor V. Assuming that L is water and V steam, heat is introduced into the "energy-in" segment A-B to cause vaporization of the liquid phase L generating a gaseous or vapor state V. Expansion of the vapor phase then drives the spheroids around the continuous loop passageway in a manner similar to that described in conjunction with FIGS. 1–3. Although it is possible to vent the gas or vapor and reintroduce a gas or liquid in the manner of the embodiments of FIGS. 1 and 2, for example, generally a Rankine cycle is a closed system. Accordingly, heat is removed within the segment B–C and actually within the entire segment B–D to allow condensation and contraction of the vapor in advance of the spheroids and allow acceleration particularly within the segment B–C. Acceleration reaches the maximum at approximately the position C. Thus, a linear generator is advantageously positioned within the segment C–D; however it may be employed to remove a portion of the kinetic energy of the moving spheroids anywhere within the segment A–D.

The fact that the invention may also utilize the thermodynamic principles of an Otto or a diesel cycle is demonstrated by the illustrative drawing of FIG. 5. In this embodiment, the "energy-in" segment A–B is provided with an expanding gas by way of the principles of internal combustion. In this respect, a combustion chamber, not shown, may be provided in or in communication with the continuous loop passageway within the segment A–B. Such a combustion chamber would be provided with a combustible gaseous phase from a conventional carburetor system. Ignition is supplied by a conventional spark plug type device such as that used in any conventional internal combustion engine. Ignition and combustion will be cycled to effect expanding gas behind each spheroid as it passes through segment A–B and cause acceleration within the expansion segment B–C. That is, the fuel in the combustion chamber will be combusted or burned periodically to propel successive ones of the spheroids in a counterclockwise direction. As was the case with the Brayton cycle, heat and working fluid are advantageously vented within the segment C–D and compressible working fluid is introduced at a succeeding point within the segment C–D. Compression of the working fluid takes place within the segment D–A as in the embodiments of FIGS. 1 and 2; while energy in the form of a compressed fluid may be bled from the system within the segment D–A as an alternative means of deriving energy from the device.

In FIG. 6, another embodiment of the invention is shown wherein the input energy is in the form of electrical energy rather than heat used to expand a fluid medium. The embodiment of FIG. 6 again includes a continuous closed loop passageway 80 containing a plurality of spheroids 82. The passageway 80 is again formed from a non-magnetically permeable material such as aluminum and is provided at one point in its periphery with a compressed gas outlet 84 and at another point in its periphery with a gas inlet 86. In this case, however, the spheroids 82 are accelerated by means of a traveling wave accelerator 88 which produces a traveling magnetic field, causing the spheroids 82, formed from magnetically permeable material, to be propelled in a counterclockwise direction to the other side of the closed loop passageway 80 where they pass through the magnetic field of a linear generator 90. Thus, the kinetic energy of the spheroids 82 is converted by the linear generator 90 into electrical energy in the manner described above. From the linear generator, the spheroids travel around to the accelerator 88 where they are again propelled forwardly through another cycle.

It will be appreciated that the linear generator extracts a part of the kinetic energy by magnetic forces and, hence, exerts a force on each spheroid in a sense opposite to that imparted by the accelerator 88. Consequently, the gas between the accelerator and the linear generator is compressed and may be extracted as compressed gas. The spheroids proceed from the linear generator 90 to the gas inlet 86 where uncompressed gas is added to the system and swept with the spheroids to the accelerator 88. The electrical energy extracted from the linear generator can be used externally or can be fed back to the accelerator 88 to partially compensate for the energy supplied to the system at this point.

In FIG. 7, still another embodiment of the invention is shown wherein spheroids 92 within a continuous closed loop passageway 94 are propelled by any of the systems heretofore described. It will be assumed, however, that for purposes of illustration, the system of FIG. 2 is employed wherein heat is supplied to expand the gas in a heater or heat exchanger 96, the expanded gas propelling the spheroids 92 around the passageway 94. In this case, however, energy is extracted from the moving spheroids by means of a magnet and disc assembly 98 connected to a crankshaft 100. The magnet and disc assembly 98 comprises a pair of discs 101 and 102 which carry therebetween a plurality of horseshoe or U-shaped magnets 104 having north and south poles 106 and 108 on opposite sides of the continuous loop passageway 94. With this arrangement, the spheroids 92, formed of magnetically permeable material, will attract successive ones of the horseshoe magnets 104 as they are propelled past the magnet and disc assembly 98, causing rotation of the crankshaft 100.

It will be noted that all of the systems thus described have in common an "energy-in" and "energy-out" cycle. The "energy-in" step may be effected by the input of energy in the form of an expanding fluid medium or electrical energy. The "work-out" portion of the cycle can be effected by the various devices shown including linear generators, compression of gas, or rotation of a magnet and disc assembly such as that of FIG. 7. All of the systems, have one thing in common, namely the utilization of freely movable, mechanically unrestrained spheroids or pistons within the continuous loop passageway.

It will be appreciated that the closed loop passageway 12 of any of the embodiments need not be a perfect circle but could well be elliptical or assume almost any configuration which would not materially interfere with the efficiency of the system. Also, the spheroids 16 may be of any configuration and may indeed be pistons designed to move freely about a loop. In any of the embodiments, it will be realized that momentum changes and zones must be in equilibrium as the pistons accelerate and/or decelerate around the loop. Appropriate means for supplying external forces to counteract accelerating and decelerating forces may be supplied by mechanical mechanisms as described in FIG. 1 or by electric linear generators and accelerators.

When work is taken from the "work-out" section of the cycle the kinetic energy of each freely movable body therein is partially depleted. The corresponding velocity change means a momentum change, and since the momentum must be balanced around the loop the momentum loss in the work-out section must be made up. When the loop, around which the free bodies travel, is in a vertical plane, the force of gravity can be used to provide at least part of the thrust to make up the momentum loss. This is not possible, of course, when the loop is in a horizontal plane. The embodiment of the invention illustrated in FIGS. 8 and 9 is for use in a horizontal plane, or at least in a plane in which gravity does not provide the desired thrust for the free bodies.

In this particular embodiment, the closed loop passageway is elliptical instead of circular. It is formed from a tube 111 having semi-circular end portions connected by parallel side portions. The tube is rigidly mounted on a base plate 112. Rotatably mounted in the plate at the axis of one curved end of the loop is a drive shaft 113, on the upper end of which a thruster wheel is rigidly mounted. This wheel has a round central portion 114, around which there is a plurality of circumferentially spaced pockets having open outer ends. These pockets preferably are formed between blades or paddles 115 projecting radially outwardly from the central portion of the wheel. The end portion of the loop that curves around the wheel is provided with an arcuate slot 116 in its inner face, into which the outer ends of the adjoining paddles project. As the wheel is rotated, the paddles move into one end of the slot and then along its length and out of its opposite end. Spherical bodies or balls that fit within tube 111 enter the pockets or spaces between the paddles and are moved along by the driven wheel. Only two of the balls 117 are indicated in dotted lines, but it will be understood that there are many more in the loop. The wheel is driven at a speed that will provide the desired thrust to the balls as they leave it and enter the expander section of the loop.

The opposite curved end of the loop likewise is provided with an arcuate slot 120, into which project the blades 121 of a paddlewheel that is like the one just described and that is rigidly mounted on a driven shaft 122 journalled in the end of the base plate. However, this wheel does not impart thrust to the balls but is driven by them as they strike the blades of the wheel projecting into slot 120. Preferably, the blades are made of spring steel to absorb some of the shock of being struck by the high velocity balls from the expander section of the loop. Shaft 122 serves as a power output shaft and part of the power that it delivers may be used in driving the thruster wheel, or the latter can be driven independently by a motor. The balls leave the power take-off wheel at the tangential velocity of that wheel and enter the compressor section of the loop.

To accelerate the balls after they leave the thruster wheel in order to provide them with the desired velocity, the expander side of the loop is provided in its side wall with an air inlet 123 that is connected by a pipe 124 to a lateral air outlet 125 in the opposite side of the loop. Compressed air that flows through this pipe from one side of the loop to the other passes through a heat exchanger 126 of any suitable construction, where the air is heated to expand it. The air was compressed in the loop by balls leaving the power take-off wheel and traveling through the compressor portion of the loop between that wheel and the inlet of pipe 124. Energy in the form of heat absorbed in the heat exchanger causes the compressed gas passing through the exchanger to expand and increase the velocity of the jet of air that impels the balls forward through the expander section of the loop. A check valve 127 prevents blowback of the expanding compressed air into the compressor section of the loop.

After the balls pass compressed air outlet 125 they enter the thruster section of the apparatus which, for best results, is provided with an air-tight housing 128 to prevent loss of compressed air from the cycle at that point. The balls entering the housing are carried forward around the loop by the thruster wheel to increase their momentum, much of which was lost at the opposite end of the loop and while compressing air after leaving that end. The balls leaving housing 128 are once again propelled at high velocity by the jet of air at inlet 123 to drive the power take-off wheel and to compress the air ahead of them in the compressor section of the loop. Of course, it will be understood that a greater quantity of energy is removed by the driven shaft 122 than is supplied to the system by the thruster wheel via drive shaft 113. For start-up, the thruster wheel is rotated by an external power supply. Once in relatively steady operation, a fraction of the power output from shaft 122 can be fed back to power the thruster wheel.

The cycle disclosed herein has been found to be considerably more efficient than other cycles, such as the Brayton cycle. Although our cycle is similar to a Brayton cycle, it is not the same as will be apparent from the diagram of FIG. 10, which shows that the gas is compressed in the compressor section 1–2 with a reduction in gas volume and then expanded from 2 to 3 to increase its volume without reducing its pressure. From 3 to 4 there is increasing volume with loss of pressure, and then a sudden drop in pressure from 4 to 5 at a constant volume.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In the method for converting the kinetic energy of moving bodies into electrical energy, the steps of:
  a. providing a closed, continuous loop passageway formed from non-magnetically permeable material and containing a plurality of freely movable, mechanically unrestrained bodies;
  b. applying a force to successive ones of said bodies in a first region of said passageway to thereby propel successive ones of the bodies in one direction around the passageway;
  c. permitting said bodies, after being propelled, to essentially freely accelerate in a second region of the passageway;
  d. at a point beyond said first and second regions in the passageway providing lines of flux which intersect the path of travel of said freely movable bodies passing through said passageway whereby the propelled bodies will intersect the lines of flux thus produced to generate an electrical current; and
  e. then returning successive ones of said bodies through a third region back to said first region where they are again propelled in said one direction, the bodies being further decelerated in said third region.

2. The method of claim 1 wherein said bodies are formed of magnetically permeable material.

3. The method of claim 1 wherein said force is applied to successive ones of said bodies in said first region by combustion of a gaseous fuel mixture.

4. The method of claim 1 wherein said bodies are propelled through said passageway by subjecting the bodies to a magnetic field.

5. The method of claim 4 wherein said magnetic field is produced by a linear generator.

6. Apparatus for converting one form of energy into electrical energy, comprising:
  a. a closed, continuous loop passageway formed of non-magnetically permeable material;
  b. a plurality of freely movable, mechanically unrestrained bodies of magnetically permeable material disposed within said passageway;
  c. means for generating an internal force between successive ones of said bodies in a first region of said passageway to thereby propel successive ones of the bodies in one direction around the passageway;
  d. means in a second region of said passageway to permit said bodies to essentially freely accelerate after being propelled;
  e. electromagnetic means beyond said first and second regions of the passageway for converting at least a portion of the kinetic energy of the propelled bodies into electrical energy; and
  f. means for causing said bodies to decelerate prior to reentry into said first region.

7. The apparatus of claim 6 wherein said means for applying a force to successive ones of said bodies comprises a linear accelerator.

8. The apparatus of claim 6 wherein said electromagnetic means comprises means for producing a magnetic field which is intersected by said propelled bodies, whereby the intersection of said magnetic field by said bodies will cut lines of flux to induce an electrical current.

9. In the method for converting the kinetic energy of moving bodies into another form of energy, the steps of:
  a. providing a closed, continuous loop passageway containing a plurality of freely movable, mechanically unrestrained bodies;
  b. expanding a fluid medium by combustion of a gaseous fuel mixture being successive ones of said bodies in a first region of said passageway to thereby propel successive ones of the bodies in one direction around the passageway;
  c. permitting said bodies, after being propelled, to essentially freely accelerate in a second region of the passageway;
  d. at a point beyond said first and second regions in the passageway converting at least a portion of the kinetic energy of the propelled bodies into another form of energy; and
  e. then returning successive ones of said bodies through a third region back to said first region where they are again propelled in said one direction by combustion of a gaseous fuel mixture, the bodies being further declerated in said third region by compression of a gas.

10. In the method for converting a first form of energy into a second form of energy, the steps of:
  a. providing a closed, continuous loop passageway containing a plurality of freely movable, mechanically unrestrained bodies;
  b. applying a force to successive ones of said bodies in a first region of said passageway to thereby propel successive ones of the bodies in one direction around the passageway;
  c. permitting said bodies, after being propelled, to essentially freely accelerate in a second region of the passageway;
  d. at a point beyond said first and second regions in the passageway converting at least a portion of the kinetic energy of the propelled bodies into energy in the form of compressed fluid; and e. then returning successive ones of said bodies through a third region back to said first region where they are again propelled in said one direction, the bodies being further decelerated in said third region by compression of a gas.

* * * * *